(12) United States Patent
Milicevic et al.

(10) Patent No.: US 10,584,055 B2
(45) Date of Patent: Mar. 10, 2020

(54) ROTARY FEED-THROUGH FOR MOUNTING A ROTATING SUBSTRATE TUBE IN A LATHE, A CVD LATHE AND A CORRESPONDING METHOD USING THE CVD LATHE

(71) Applicant: Draka Comteq B.V., Amsterdam (NL)

(72) Inventors: Igor Milicevic, Amsterdam (NL); Raoul Hens, Amsterdam (NL); Johannes Antoon Hartsuiker, Amsterdam (NL); Gertjan Krabshuis, Amsterdam (NL); Mattheus Jacobus Nicolaas van Stralen, Amsterdam (NL)

(73) Assignee: Draka Comteq B.V., Amsterdam (NL)

( * ) Notice: Subject to any disclaimer, the term of this patent is extended or adjusted under 35 U.S.C. 154(b) by 104 days.

(21) Appl. No.: 15/560,247

(22) PCT Filed: Mar. 22, 2016

(86) PCT No.: PCT/NL2016/050198
§ 371 (c)(1),
(2) Date: Sep. 21, 2017

(87) PCT Pub. No.: WO2016/153346
PCT Pub. Date: Sep. 29, 2016

(65) Prior Publication Data
US 2018/0079678 A1 Mar. 22, 2018

(30) Foreign Application Priority Data
Mar. 25, 2015 (NL) ..................................... 2014519

(51) Int. Cl.
*C03B 37/018* (2006.01)

(52) U.S. Cl.
CPC .... *C03B 37/01884* (2013.01); *C03B 37/0183* (2013.01); *C03B 37/01807* (2013.01); *C03B 37/01823* (2013.01)

(58) Field of Classification Search
CPC ............ C03B 23/045; C03B 37/01486; C03B 37/01884
See application file for complete search history.

(56) References Cited

U.S. PATENT DOCUMENTS

| | | | | |
|---|---|---|---|---|
| 4,347,069 A | * | 8/1982 | Haney | ................... C03B 23/045 427/231 |
| 4,389,231 A | | 6/1983 | Partus | |

(Continued)

FOREIGN PATENT DOCUMENTS

| | | |
|---|---|---|
| CN | 202968387 U | 6/2013 |
| JP | 2011088790 A | 5/2011 |

(Continued)

*Primary Examiner* — Cynthia Szewczyk
(74) *Attorney, Agent, or Firm* — Shumaker, Loop & Kendrick, LLP

(57) ABSTRACT

A rotary feed-through for mounting a rotating substrate tube in a lathe and providing a flow of process gas into the tube, said feed-through including a process gas supply line for providing a process gas into said substrate tube, a rotatable holder arranged for receiving and holding said substrate tube for rotating said substrate tube with respect to said process gas supply line, a rotary union provided between said rotatable holder and said process gas supply line for rotatably connecting said rotatable holder to said process gas supply line, a stationary housing connected to said process gas supply line and to said rotatable holder, therewith forming a closed cavity surrounding said rotary union, wherein said stationary housing further includes an auxiliary gas supply line for providing said closed cavity with an auxiliary gas.

14 Claims, 2 Drawing Sheets

(56) References Cited

U.S. PATENT DOCUMENTS

| | | | | |
|---|---|---|---|---|
| 4,412,683 A | * | 11/1983 | Haney | C03B 23/045 |
| | | | | 277/350 |
| 4,616,901 A | | 10/1986 | MacChesney et al. | |
| 6,359,400 B1 | * | 3/2002 | Mueller | C03B 23/045 |
| | | | | 318/400.08 |
| 6,430,967 B1 | * | 8/2002 | Mueller | C03B 37/018 |
| | | | | 118/692 |
| 2002/0136515 A1 | * | 9/2002 | Schaper | C03B 37/01205 |
| | | | | 385/123 |
| 2003/0182968 A1 | * | 10/2003 | Cai | C03B 23/045 |
| | | | | 65/158 |
| 2006/0112734 A1 | | 6/2006 | Kim et al. | |

FOREIGN PATENT DOCUMENTS

| | | |
|---|---|---|
| KR | 100669580 B1 | 1/2007 |
| WO | 86/04573 A1 | 8/1986 |
| WO | 2007102168 A1 | 9/2007 |

\* cited by examiner

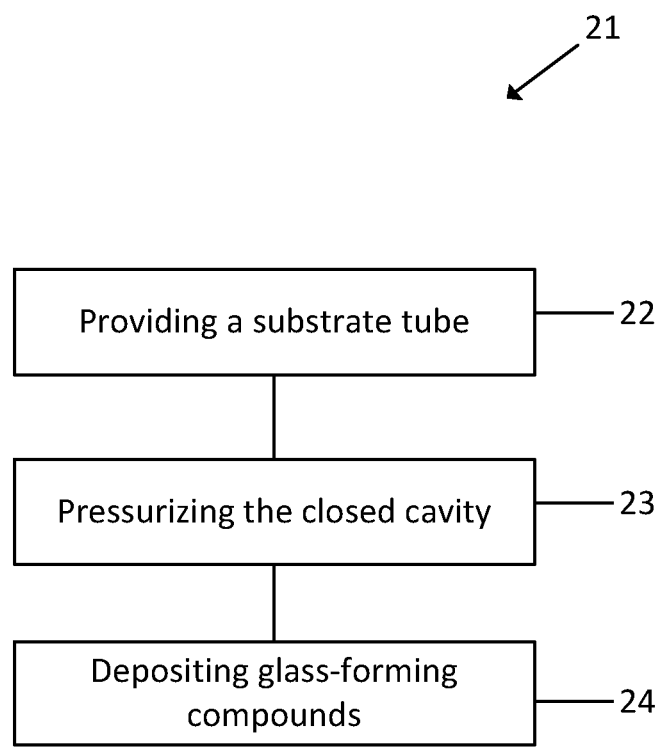

ROTARY FEED-THROUGH FOR MOUNTING A ROTATING SUBSTRATE TUBE IN A LATHE, A CVD LATHE AND A CORRESPONDING METHOD USING THE CVD LATHE

TECHNICAL FIELD AND BACKGROUND OF THE INVENTION

The present invention relates to a rotary feed-through for mounting a rotating substrate tube in a lathe and providing a flow of process gas into the substrate tube. The present invention further relates to a method for manufacturing a preform for optical fibres using Chemical Vapour Deposition, CVD, and a lathe comprising the new rotary feed-through.

The deposition of glass layers on the interior of a substrate tube, wherein one or more reactive gases and an oxygen-containing gas are supplied to said substrate tube, is known per se, for example from U.S. Pat. No. 6,260,510 in the name of the present applicant. According to the method that is known therefrom, layers of silicon dioxide, which may or may not be doped (e.g. germanium-doped silicon dioxide), are coated onto the interior surface of a substrate tube consisting of quartz glass, for example. Such a deposition reaction may be carried out by positioning the substrate tube along the cylindrical axis of the resonant cavity and subsequently flushing the inside of the tube with a gaseous mixture comprising oxygen, silicon chloride and germanium chloride, for example. Following that, a localized plasma is generated within the substrate tube so as to produce direct deposition of germanium-doped silicon dioxide on the interior surface of the substrate tube. Since such deposition only occurs in the vicinity of the localized plasma, the resonant cavity (and thus the plasma) must be reciprocated along the cylindrical axis of the substrate tube in order to coat the substrate tube uniformly along the entire length thereof. When the deposition of the layers is completed, the substrate tube is thermally treated in such a manner that it will contract into a rod, which rod is also called an optical preform. If the end of the optical preform is heated in such a manner that said end starts to melt, an optical fibre can be drawn from the rod and be wound onto a reel. Such an optical fibre thus has a core-cladding portion corresponding to that of the optical preform. Because a germanium-doped core has a higher refractive index than the undoped cladding, for example, the fibre can act as a waveguide, viz. for use in propagating optical telecommunication signals. It should be noted, however, that the gaseous mixture that is flushed through the inner part of the substrate tube may also contain other components; a fluorine-containing compound may be added, causing a reduction in the refractive index of the doped silicon dioxide.

The use of such a fibre for telecommunication purposes requires the fibre to be substantially free from contamination, since such contamination can cause serious attenuation of the signal being carried if great fibre lengths are used. As a result, it is important not only that the aforesaid PCVD process be highly uniform, but also that the reactive gases used for the deposition do not contain any undesirable impurities. During the aforesaid chemical vapour deposition, the hydrogen atoms can thus form —OH-bonds in the glass layers that have been deposited on the interior of the substrate tube, which —OH-bonds have a strongly adverse effect on the transmission spectre of a fibre drawn from an optical preform, in particular on account of the strong absorption thereof at 1250 nm and 1385 nm. Such absorption losses due to the presence of small amounts of impurities in the gaseous starting material can amount to 10-20 dB/km of a wavelength of 1385 nm. Although prior art methods exist for preventing the incorporation of such —OH-groups into the optical glass fibre, for example by carrying out a chlorination step following the deposition step in the case of porous glass structures, as known from U.S. Pat. No. 4,675,038, or by adding fluorine during the chemical vapour deposition reaction, for example, as known from European patent application No. 0 127 227, both prior art methods have this drawback that an additional amount of chlorine or fluorine, respectively, will find its way in the final glass structure, leading to increased attenuation losses caused by Rayleigh scattering.

Light guidance takes place in a small part of an optical glass fibre, viz. the optical core, and a small part of the cladding surrounding said core. It is important, therefore, that optical preforms from which an optical glass fibre is drawn, which glass fibre is responsible for the light conduction, be free from impurities, in particular hydroxyl groups.

European patent application No. 0 401 742 relates to an OVD process wherein silicon dioxide free from hydroxyl ions is deposited on a substrate, which substrate is localized in a space that is separated from the surrounding atmosphere.

European patent application no. 0 477 4996.5, in the name of the present applicant discloses a method to combat the above mentioned contaminations, wherein a method is disclosed for manufacturing a preform for optical fibres, wherein deposition of glass-forming compounds on a substrate tube takes place, wherein the deposition step is carried out in an environment in which the substrate is present in a conditioned atmosphere, which conditioned atmosphere has a moisture content lower than that of the non-conditioned atmosphere.

The downside of such a method is that the complete CVD lathe thus has to be placed in a conditioned atmosphere, such that no contamination is able to enter the substrate tube. This may be a cumbersome and radical process as this would probably involve a redesign of the factory layout.

One aspect of the present invention is thus to provide for a rotary feed-through for mounting a rotating substrate tube in a lathe and providing a flow of process gas into the tube, wherein no contamination is able to enter the substrate tube via the rotary-feed through.

Another aspect of the present invention is to provide for a Chemical Vapour Deposition, CVD, lathe comprising such a rotary feed-through.

Yet another aspect of the invention is to provide for a method for manufacturing a preform for optical fibres using the new Chemical Vapour Deposition, CVD, lathe, wherein deposition of glass-forming compounds on a received substrate tube takes place.

The above mentioned objects are achieved by the present invention.

SUMMARY OF THE INVENTION

The present invention relates to a rotary feed-through for mounting a rotating substrate tube in a lathe and providing a flow of process gas into the tube, said feed-through comprising:
 a process gas supply line for providing a process gas into said substrate tube;
 a rotatable holder arranged for receiving and holding said substrate tube for rotating said substrate tube with respect to said process gas supply line;

a rotary union provided between said rotatable holder and said process gas supply line for rotatably connecting said rotatable holder to said process gas supply line;

a stationary housing connected to said process gas supply line and to said rotatable holder, therewith forming a closed cavity surrounding said rotary union, wherein said stationary housing further comprises an auxiliary gas supply line for providing said closed cavity with an auxiliary gas.

a further rotary union provided between said rotatable holder and said stationary housing for rotatably connecting said rotatable holder to said stationary housing for providing a seal between said closed cavity and an outer environment of said rotary feed through such that said closed cavity can be pressurized by said auxiliary gas.

In an embodiment, said stationary housing is connected to said rotatable holder via at least one ball bearing.

In another embodiment, said rotatable holder comprises:

a receiving section having an opening, said receiving section arranged for receiving said substrate tube such that a first end of said substrate tube penetrates in said receiving section;

a holding part arranged for holding said first end of said substrate tube, said holding part comprises at least a sealing member for substantially sealing said receiving section and said first end of said substrate tube received in said opening thereof.

In another embodiment, said holding part comprises two separate, adjacently located, sealing members, and wherein said receiving section comprises a through hole oriented between said two sealing members such that an area enclosed by said two sealing members and said substrate tube, when received in said receiving section, is in direct contact with said cavity.

In another embodiment, said sealing members comprise O-rings.

In another embodiment, said rotary feed-through is arranged for mounting a rotating substrate tube in a Chemical Vapour Deposition, CVD, lathe.

The present invention also relates to a Chemical Vapour Deposition, CVD, lathe arranged for holding and rotating a substrate tube during manufacturing of a preform for optical fibres, wherein deposition of glass-forming compounds on said substrate tube takes place, said CVD lathe comprising the new rotary feed-through, said CVD lathe further comprising:

process gas means for providing said process gas to said process gas supply line at a process gas pressure;

auxiliary gas means for providing said auxiliary gas to said cavity, via said auxiliary gas supply line, for creating an auxiliary gas pressure in said closed cavity.

In an embodiment, said auxiliary gas pressure is lower than said process gas pressure.

In another embodiment, the CVD lathe is arranged to operate in an ambient pressure, wherein said auxiliary gas pressure is higher than said ambient pressure.

In another embodiment, said auxiliary gas contains less than 10 ppm impurities, preferably said auxiliary gas is one of Oxygen, Nitrogen, Argon and Helium.

In another embodiment, said CVD lathe further comprising said received substrate tube.

The present invention further relates to a method for manufacturing a preform for optical fibres using the new Chemical Vapour Deposition, CVD, lathe, wherein deposition of glass-forming compounds on a received substrate tube takes place, said method being characterized by the step of:

pressurizing, using said auxiliary gas means, said closed cavity at said auxiliary gas pressure during said deposition step.

In an embodiment, said step of pressurizing comprises:

pressurizing, using said auxiliary gas means, said closed cavity at said auxiliary gas pressure during said deposition step, wherein said auxiliary gas pressure is either lower than said process gas pressure or higher than the ambient pressure.

In another embodiment, said method further comprises the step of:

contracting, after said deposition step, said substrate tube into a massive preform, wherein said pressurizing step is also performed during said contracting step.

In another embodiment said deposition step is a PCVD deposition step.

The invention is explained in more detail below.

Definitions as Used in the Present Description

The following definitions are used in the present description and/or claims to define the stated subject matter. Other terms not cited below are meant to have the generally accepted meaning in the field.

"hollow substrate tube" as used in the present description means: an cylindrical tube having a cavity within. Generally, the inside of said tube is provided (or coated) with a plurality of glass layers during the manufacturing of a preform.

"interior surface" as used in the present description means: the inside surface or inner surface of the hollow substrate tube.

"glass" or "glass material" as used in the present description means: crystalline or vitreous (glassy) oxide material—e.g. silica ($SiO_2$) or even quartz—deposited by means of a vapour deposition process.

"silica" as used in the present description means: any substance in the form of $SiO_x$, whether or not stoichiometric, and whether or not crystalline or amorphous.

"glass-forming gases or compounds" as used in the present description means: reactive gases used during the deposition process to form glass layers (e.g. $O_2$ and $SiCl_4$). These glass forming gases may comprise a precursor for a dopant. (e.g. $GeCl_4$ and optionally others).

"plasma" as used in the present description means: an ionized gas consisting of positive ions and free electrons in proportions resulting in more or less no overall electric charge at very high temperatures. The plasma is usually induced by microwaves.

The above-mentioned and other features and advantages of the invention will be best understood from the following description referring to the attached drawings. In the drawings, like reference numerals denote identical parts or parts performing an identical or comparable function or operation.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below or a particular method for manufacturing the optical preform.

The present invention does not require significant changes to the instrumental setup or devices/apparatuses that are already in use. Therefore, the solution to the problem presented in the present invention is simple and cost-effective to implement.

BRIEF DESCRIPTION OF THE DRAWINGS

FIG. 2 discloses an example of a flow chart illustrating the steps of a method according to the present invention.

DETAILED DESCRIPTION OF THE INVENTION

Figure 1:
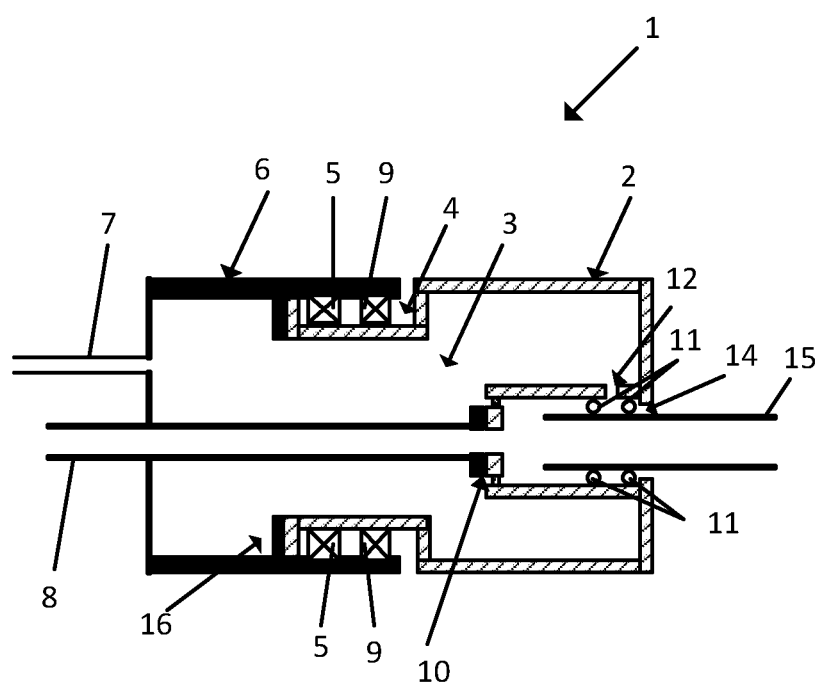
FIG. 1 discloses an example of a rotary feed-through for mounting a rotating substrate tube in a lathe.

The present invention relates, in a first aspect, to a rotary feed-through for mounting a rotating substrate tube in a lathe and providing a flow of process gas into the tube, said feed-through comprising:
 a process gas supply line for providing a process gas into said substrate tube;
 a rotatable holder arranged for receiving and holding said substrate tube for rotating said substrate tube with respect to said process gas supply line;
 a rotary union provided between said rotatable holder and said process gas supply line for rotatably connecting said rotatable holder to said process gas supply line;
 a stationary housing connected to said process gas supply line and to said rotatable holder, therewith forming a closed cavity surrounding said rotary union, wherein said stationary housing further comprises an auxiliary gas supply line for providing said closed cavity with an auxiliary gas.
 a further rotary union provided between said rotatable holder and said stationary housing for rotatably connecting said rotatable holder to said stationary housing for providing a seal between said closed cavity and an outer environment of said rotary feed through such that said closed cavity can be pressurized by said auxiliary gas.

As discussed above, a disadvantage in the present process for manufacturing a preform for optical fibres is that contamination, for example in the form of hydroxyl groups, tend to intrude, from the ambient, into the substrate tube via the rotary feed-through causing a significant increase in the attenuation losses of the optical fibres.

As explained above, one of the objects of the present invention is to provide for a rotary feed-through for mounting a rotating substrate tube in a lathe and providing a flow of process gas into the tube, wherein the intrusion of contamination, i.e. hydroxyl groups, into the substrate tube is being prevented.

The invention is based on the finding by the present inventors that, contamination is mainly able to enter the substrate tube via very small leaks in the rotary union. The inventors found that, in order to combat that phenomena, the rotary union should be surrounded by a closed cavity, and that the closed cavity should be connected to an auxiliary gas supply line such that the cavity can be provided and pressurized with an auxiliary gas.

In case the cavity is being pressurized, using the auxiliary gas, with an auxiliary gas pressure less than the process gas pressure, a suction effect occurs which ensures that any contamination entering the cavity will be discharged via the auxiliary supply line. As such, no contamination is able to reach the rotary union and is thus also not able to enter the substrate tube via possible leaks in the rotary union.

In case the cavity is being pressurized, using the auxiliary gas, with an auxiliary gas pressure higher than the ambient pressure, for example the atmospheric pressure, of the rotary feed-through, the contamination cannot enter the cavity due to the pressure difference, and is thus also not able to reach the rotary union, and thus also not able to enter the substrate tube via leaks in the rotary union.

In the context of the present invention, a substrate tube is a hollow tube where layers of glass may be deposited in the inside surface thereof, therewith forming a precursor for a primary preform. A substrate tube having deposited layers of glass in the inside surface thereof may be obtained from an internal vapour deposition process, such as from an internal plasma deposition process, e.g. by means of a CVD.

A lathe is a machine tool which is able to rotate the substrate tube on its axis such that the deposition of the layers of glass is performed homogenously inside the substrate tube.

The process gas may be a gaseous mixture comprising oxygen, silicon chloride and germanium chloride, for example. Deposition of germanium-doped silicon dioxide on the interior surface of the substrate tube is then obtained by locally energizing the gas mixture in the substrate tube e.g. by locally heating the substrate tube from the outside using burners or a furnace, or by locally generating a plasma inside the substrate tube. The heat source or plasma is reciprocating over the length of the substrate tube.

The stationary housing, according to the present invention, is a housing which does not rotate, move, or the like, during operation, i.e. during the process of depositing glass layers on the inside of the substrate tube. The rotatable holder thus rotates along its axis with respect to the process gas supply line and thus also with respect to the stationary housing.

In an embodiment, the further rotary union comprises at least one ball bearing. A ball bearing is a type of rolling-element bearing that uses balls to maintain the separation between the bearing races, i.e. between the stationary housing and the rotatable holder.

The purpose of a ball bearing is to reduce rotational friction and support radial and axial loads. It achieves this by using at least two races to contain the balls and transmit the loads through the balls. In the present application, one race is stationary, i.e. the stationary housing, and the other is attached to the rotating assembly, i.e. the rotatable holder. As one of the bearing races rotates it causes the balls to rotate as well. Because the balls are rolling they have a much lower coefficient of friction than if two flat surfaces were sliding against each other.

The above-mentioned ball bearings may be subject to small leaks as well, such that contamination present in gas is able to reach the rotary union. The contamination will not reach the rotary union, by either creating an overpressure higher than the ambient pressure, or by creating a vacuum inside the closed cavity, respectively.

In another embodiment, the rotatable holder comprises:
 a receiving section having an opening, said receiving section arranged for receiving said substrate tube such that a first end of said substrate tube penetrates in said receiving section;
 a holding part arranged for holding said first end of said substrate tube, said holding part comprises at least a sealing member for substantially sealing said receiving section and said first end of said substrate tube received in said opening thereof.

The receiving section may resemble a mouth, wherein the substrate tube can be inserted, with a certain extent, into the mouth via its opening. Typically, a substrate tube has a round circumferential outer edge. The receiving section may then have a similarly shaped circumferential inner edge, but then a little larger, such that the tube can be placed inside the receiving section. The holding part of the rotatable holder is then arranged to substantially seal the interior of the substrate tube from the ambient. This is accomplished by at least one sealing member, which at least one sealing member connects to the receiving section, at the circumferential inner edge thereof, and to the hollow substrate tube for providing a substantially air tight connection between them.

Alternatively, the at least one sealing member is securely connected to said hollow substrate tube, at the first end thereof, and it connects in a substantially air tight manner to the receiving section once the substrate tube is inserted into the receiving section.

In a further embodiment, for assuring a better fixation of the substrate tube when for example heavier substrate tubes are used, the holding part comprises two separate, adjacently located, sealing members, and wherein said receiving section comprises a through hole oriented between said two sealing members such that an area enclosed by said two sealing members and said substrate tube, when received in said receiving section, is in direct contact with said cavity.

The inventors found that the sealing members may form another cause for leakage of contamination into the substrate tube. The above-identified sealing members may substantially seal the interior of the hollow substrate tube from the ambient, but still some amount of contamination may leak from the ambient into the substrate tube. The sealing members are then not completely air tight.

By incorporating two separate sealing members, and by directly connecting the inner space between these sealing members to the closed cavity, i.e. via the through hole, the pressure inside the closed cavity is also present between the sealing members. This has the advantage effect that gas contamination present in the ambient gas cannot enter the substrate tube for the same reasons as explained above.

Typically, the sealing members are O-rings, also known as a packing or a toric joint, which is a mechanical gasket in the shape of a torus. It may be a loop of elastomer with a round cross-section, designed to be seated in a groove and compressed during placement of the substrate tube between the substrate tube and the rotatable holder, creating a seal at their interface.

O-rings are beneficial seals used in the present rotary feed-through because they are inexpensive, easy to make, reliable, and have simple mounting requirements.

In another embodiment, the rotary feed-through is arranged for mounting a rotating substrate tube in a Chemical Vapour Deposition, CVD, lathe.

The present invention relates, in a second aspect, to a Chemical Vapour Deposition, CVD, lathe arranged for holding and rotating a substrate tube during manufacturing of a preform for optical fibres, wherein deposition of glass-forming compounds on said substrate tube takes place, said CVD lathe comprising a rotary feed-through according to present invention, said CVD lathe further comprising:
  process gas means for providing said process gas to said
    process gas supply line at a process gas pressure;
  auxiliary gas means for providing said auxiliary gas to
    said cavity, via said auxiliary gas supply line, for
    creating an auxiliary gas pressure in said closed cavity.

The process gas means may, for example, comprise a process gas storage tank, storing said process gas, and/or mass flow controllers, and/or valves for distributing said process gas through said process gas supply line towards said substrate tube. Typically, the process gas pressure present inside the process gas supply line and the substrate tube is around 10 mbar, which may be controlled via the process gas means.

The auxiliary gas means may also comprise an auxiliary gas storage tank, storing said auxiliary gas, and/or mass flow controllers, and/or valves for distributing said auxiliary gas through said auxiliary gas supply line towards said closed cavity. Typically, the auxiliary gas pressure present inside the closed cavity is either lower then 10 mbar or higher than the ambient pressure, i.e. higher than 1 bar, for example around 1.5 bar.

In case the auxiliary gas pressure inside the closed cavity is lower than the process gas pressure, then a suctioning effect occurs, which sucks all possible contamination present in the closed cavity via the auxiliary gas supply line.

In case the auxiliary gas pressure inside the closed cavity is higher than the ambient pressure, then a pressurized effect occurs, which makes sure that possible contamination present in the ambient air will not enter the closed cavity. As, in such a case, the auxiliary gas may leak into the substrate tube, for example via the rotary union or via the sealing members, the auxiliary gas preferably contains less than 10 ppm impurities. Preferably said auxiliary gas is any of Oxygen, Nitrogen, Argon or Helium.

In another embodiment, the CVD lathe comprises the received substrate tube.

The present invention relates, in a third aspect, to a method for manufacturing a preform for optical fibres using a Chemical Vapour Deposition, CVD, lathe, wherein deposition of glass-forming compounds on a received substrate tube takes place, said method being characterized by the step of:
  pressurizing, using said auxiliary gas means, said closed
    cavity at said auxiliary gas pressure during said deposition step.

It has appeared to be possible to achieve a significant reduction of the attenuation losses caused by contamination, for example hydroxyl groups, by pressurizing the closed cavity, such that the hydroxyl groups are not able to intrude into the substrate tube.

In an embodiment, the step of pressurizing comprises:
  pressurizing, using said auxiliary gas means, said closed
    cavity at said auxiliary gas pressure during said deposition step, wherein said auxiliary gas pressure is either
    lower than said process gas pressure or higher than the
    ambient pressure.

According to the present invention, the verb pressurizing may thus comprise creating, setting or controlling the pressure inside the closed cavity to higher than the ambient temperature or lower than the process gas pressure. In the latter, a sort of vacuum may be obtained, i.e. the closed cavity is de-pressurized with respect to the process gas pressure, in which leakage of process gas into the closed cavity is sucked out.

In another embodiment, the method further comprises the step of:
  contracting, after said deposition step, said substrate tube
    into a massive preform,
  wherein said pressurizing step is also performed during
said contracting step.

In another embodiment, the deposition step is a PCVD deposition step.

The deposition step of the present invention may be carried out by using a PCVD process or an MCVD process. In case of a PCVD process, the energy required for reaction of the process gases is provided by a plasma inside the substrate tube and in case of a MCVD process a heat source external to the substrate tube is providing the energy required for the reaction. Such heat source could be a burner, such as a hydrogen/oxygen burner, or a plasma burner, or an electrical furnace. Both techniques, PCVD and MCVD, are so-called internal deposition techniques.

FIG. 1 discloses an example of a rotary feed-through 1 for mounting a rotating substrate tube 15 in a lathe, for providing a flow of process into the substrate tube 15.

The rotary feed-through comprises:
a process gas supply line 8 for providing a process gas into said substrate tube 15;
a rotatable holder 2 arranged for receiving and holding said substrate tube 15 for rotating said substrate tube 15 with respect to said process gas supply line 8;
a rotary union 10 provided between said rotatable holder 2 and said process gas supply line 8 for rotatably connecting said rotatable holder 2 to said process gas supply line 8;
a stationary housing 6 connected to said process gas supply line 8 and to said rotatable holder 2, therewith forming a closed cavity 3 surrounding said rotary union 10, wherein said stationary housing 6 further comprises an auxiliary gas supply line 7 for providing said closed cavity 3 with an auxiliary gas, and
a further rotary union 16 provided between said rotatable holder 2 and said stationary housing 6 for rotatably connecting said rotatable holder 2 to said stationary housing 6 and providing a seal between the closed cavity 3 and the outer environment of the rotary feed through 1 such that said closed cavity can be pressurized by said auxiliary gas.

In the present example, the rotatable holder 2 is connected to said stationary housing 6 via ball bearings 5, 9. That is, the further rotary union 16 comprises said ball bearing 5, 9. Contamination may enter the closed cavity 3 via the passage 4 and leakage of the ball bearings 5.

In the present example, the rotatable holding part 2 comprises two separate, adjacently located, sealing members 11, 13, and the receiving section comprises a through hole 12, such that the space between the sealing members 11 is in contact with the closed cavity 3. These sealing members 11 are O-rings, ensuring that no contamination is able to enter the substrate tube 15 via the opening indicated with reference numeral 14.

FIG. 2 discloses an example of a flow chart illustrating the steps of a method 21 for manufacturing a preform for optical fibres using a Chemical Vapour Deposition, CVD, lathe according to any of the examples provided above.

First, a substrate tube is provided 22 in the lathe. The substrate tube is capable of being deposited, at the interior side thereof, with glass layers.

Second, the closed cavity is pressurized 23, using the auxiliary gas means, at least during the following deposition step.

Finally, glass layers are deposited 24 on the interior of the substrate tube by providing the substrate tube with a process gas, and by providing a travelling and reciprocating energy source over said substrate tube for reacting the glass-forming compounds.

The present invention is not limited to the embodiment as disclosed above, and can be modified and enhanced by those skilled in the art beyond the scope of the present invention as disclosed in the appended claims without having to apply inventive skills.

The invention claimed is:

1. A rotary feed-through for mounting a rotating substrate tube in a lathe and providing a flow of process gas into the tube, said feed-through comprising:
   a process gas supply line for providing a process gas into said substrate tube;
   a rotatable holder arranged for receiving and holding said substrate tube for rotating said substrate tube with respect to said process gas supply line;
   a first rotary union provided between said rotatable holder and said process gas supply line for rotatably connecting said rotatable holder to said process gas supply line;
   a stationary housing connected to said process gas supply line and to said rotatable holder, therewith forming a closed cavity surrounding said first rotary union, wherein said stationary housing further comprises an auxiliary gas supply line for providing said closed cavity with an auxiliary gas; and
   a second rotary union provided between said rotatable holder and said stationary housing for rotatably connecting said rotatable holder to said stationary housing for providing a seal between said closed cavity and an outer environment of said rotary feed through such that said closed cavity can be pressurized by said auxiliary gas.

2. The rotary feed-through according to claim 1, wherein said second rotary union comprises at least one ball bearing.

3. The rotary feed-through according to claim 1, wherein said rotatable holder comprises:
   a receiving section having an opening, said receiving section arranged for receiving said substrate tube such that a first end of said substrate tube penetrates in said receiving section; and
   a holding part arranged for holding said first end of said substrate tube, said holding part comprises at least a sealing member for substantially sealing said receiving section and said first end of said substrate tube received in said opening thereof.

4. The rotary feed-through according to claim 3, wherein said holding part comprises two separate, adjacently located, sealing members, and wherein said receiving section comprises a through hole oriented between said two sealing members such that an area enclosed by said two sealing members and said substrate tube, when received in said receiving section, is in direct contact with said cavity.

5. The rotary feed-through according to claim 4, wherein said sealing members comprise O-rings.

6. The rotary feed-through according to claim 1, wherein said rotary feed-through is arranged for mounting a rotating substrate tube in a chemical vapour deposition (CVD) lathe.

7. A chemical vapour deposition (CVD) lathe arranged for holding and rotating a substrate tube during manufacturing of a preform for optical fibres, wherein deposition of glass-forming compounds on said substrate tube takes place, said CVD lathe comprising a rotary feed-through claim 1, said CVD lathe further comprising:
   process gas means for providing said process gas to said process gas supply line at a process gas pressure; and
   auxiliary gas means for providing said auxiliary gas to said cavity, via said auxiliary gas supply line, for creating an auxiliary gas pressure in said closed cavity.

8. The CVD lathe according to claim 7, wherein said CVD lathe further comprises said received substrate tube.

9. A method for manufacturing a preform for optical fibres using the CVD lathe according to claim 7, wherein deposition of glass-forming compounds on a received substrate tube takes place, said method further including the step of:

pressurizing, using said auxiliary gas means, said closed cavity at said auxiliary gas pressure during said deposition step.

10. The method for manufacturing a preform according to claim 9, wherein said step of pressurizing comprises:
pressurizing, using said auxiliary gas means, said closed cavity at said auxiliary gas pressure during said deposition step, wherein said auxiliary gas pressure is either lower than said process gas pressure or higher than the ambient pressure.

11. The method for manufacturing a preform according to claim 10, wherein the auxiliary gas supply line is adapted to provide auxiliary gas containing less than 10 ppm impurities.

12. The method for manufacturing a preform according to claim 10, wherein the auxiliary gas supply line is adapted to provide auxiliary gas selected from the group consisting of Oxygen, Nitrogen, Argon of Helium.

13. The method for manufacturing a preform according to claim 9, wherein said method further comprises the step of:
contracting, after said deposition step, said substrate tube into a preform,
wherein said pressurizing step is also performed during said contracting step.

14. The method for manufacturing a preform according to claim 9, wherein said deposition step is a plasma chemical vapour deposition (PCVD) deposition step.

* * * * *